(12) United States Patent
Brunnhofer

(10) Patent No.: US 6,405,541 B1
(45) Date of Patent: Jun. 18, 2002

(54) METHOD AND DEVICE FOR THE PRODUCTION OF SLUSH FROM LIQUEFIED GAS

(75) Inventor: Klaus Brunnhofer, Graz (AT)

(73) Assignee: MI Developments Austria AG & CO KG, Graz-Thorndorf (AT)

( * ) Notice: Subject to any disclaimer, the term of this patent is extended or adjusted under 35 U.S.C. 154(b) by 0 days.

(21) Appl. No.: 09/646,314
(22) PCT Filed: Mar. 4, 1999
(86) PCT No.: PCT/EP99/01418
§ 371 (c)(1),
(2), (4) Date: Oct. 23, 2000
(87) PCT Pub. No.: WO99/47872
PCT Pub. Date: Sep. 23, 1999

(30) Foreign Application Priority Data

Mar. 16, 1998 (DE) .......................................... 198 11 315

(51) Int. Cl.[7] ................................................ F17C 5/00
(52) U.S. Cl. ...................................................... 62/54.1
(58) Field of Search .......................................... 62/54.1

(56) References Cited

U.S. PATENT DOCUMENTS

| | | | |
|---|---|---|---|
| 3,354,662 A | * 11/1967 | Daunt | 62/10 |
| 3,994,141 A | * 11/1976 | Schrawer | 62/76 |
| 5,368,105 A | * 11/1994 | Chaiken et al. | 169/44 |

* cited by examiner

Primary Examiner—William Doerrler
Assistant Examiner—Malik N. Drake
(74) Attorney, Agent, or Firm—Clark Hill PLC

(57) ABSTRACT

A method for producing slush from liquefied gas wherein solid crystals are formed and mixed with the liquefied gas to produce slush. The solid crystals are produced from liquid particles which are released into or enter a gas atmosphere under pressure, wherein the temperature of the gas atmosphere is below the freezing point of the liquid particles. A device is also provided for producing the slush from liquefied gas in a cryostat container which is partly filled with the liquefied gas which mixes with the solid crystals to produce slush. The device has an atomizing device for producing the liquid particles from the liquefied gas supplied to it. The liquid particles enter a gas atmosphere which exists above the liquefied gas in the container.

28 Claims, 3 Drawing Sheets

METHOD AND DEVICE FOR THE PRODUCTION OF SLUSH FROM LIQUEFIED GAS

Figure 1:
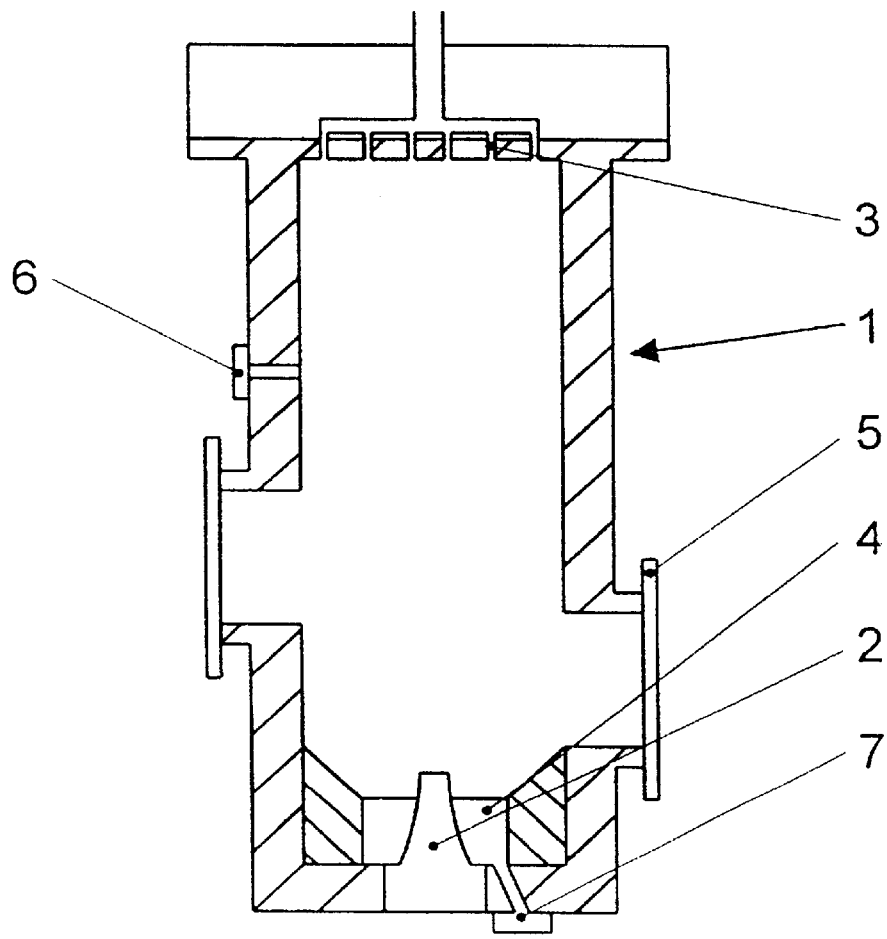

The object of the invention relates to a method for producing slush from liquefied gas, by which solid crystals are formed and mixed or are mixed with the liquefied gas to produce slush. The invention also relates to a device for producing slush from liquefied gas.

Hydrogen ($H_2$) is suitable as fuel due to its light molecular weight and its high degree of combustion heat for highly energetic rocket propellant combinations as fuel. Liquid hydrogen ($LH_2$) belongs to the cryogenic fuels and requires that the tanks be appropriately heat-insulated if applied in a motive power unit. Special safety measures must be taken when handling hydrogen. The danger of explosion by hydrogen is greater than in the case of other fuels because of its high diffusion velocity. Even small sparks (e.g. by static charge) is sufficient to cause a fire or an explosion.

Due to the requirements for space transport systems to be constructed to save weight and space, gas liquefaction and further compression of the liquid hydrogen at a low temperature was considered for storage of the driving gas, hydrogen. It was finally proposed to apply slush—with hydrogen crystals mixed with liquid hydrogen, having a crystal content of 40–60% by weight. Slush has a number of favourable characteristics, like high density, high cold content and flows well. Due to these characteristics the slush of liquefied gases is extremely suitable as a cryogenic refrigerating agent not only for space missions but also for terrestrial application.

Methods have already been developed by which hydrogen slush can be produced. The freezing-thawing technology and the Auger methods which have been described in different ways in literature also belong to these methods.

In the freezing-thawing technology, liquid hydrogen which is cooled down to triple point level, is vaporized by creating a vacuum, by which hydrogen crystals are formed on the surface of the liquid hydrogen. The vacuum pressure undergoes cyclic changes to values slightly above and slightly below the triple point pressure, by which a movable matrix of hydrogen crystals forms at a pressure which is below the triple point pressure. Hydrogen condenses on the crystals at a pressure that is slightly above the triple point pressure and the solid particles sink into the liquid. A certain advantage of this method is the relative simplicity of the required technical equipment. However, since the slush production is achieved at underpressure when this method is applied, there is a certain safety risk because an unintentional suction of air, thus the formation of an explosive hydrogen-oxygen mixture should be expected. The production quantity is also limited, perhaps due to the cooling process of the liquid hydrogen which is either achieved by the vaporization of a given quantity of liquid hydrogen via indirect cooling by means of injecting cold helium or by means of a gaseous mixture of helium-neon. The required large quantities of at least some tons per day could not be achieved according to this method up to now because of the commercial expenses involved. To improve the quality of the hydrogen slush also necessitates an aging process of one to two days.

In the case of the second indicated method for producing hydrogen slush, the Auger method, a hollow cylinder filled with helium gas and placed in liquid hydrogen is cooled down to a temperature below the freezing point of the hydrogen. The design enables the formation of solid hydrogen on the inner walls of the cylinder, which is constantly scraped off by means of a swiveling spiral. At the bottom part of the device, the hydrogen crystals which are formed by that method mixes with the liquid hydrogen to slush.

This procedure has the advantage over the freezing-thawing method that the safety risk involved is not given in this case because there is no underpressure. However, it was only possible to apply this method up to now only for the production of quantities for the laboratory. A device which is appropriate for the industrial production of slush according to this method would hardly be able to be realized because of the required mechanical efforts and the costs involved. The slush produced according to this method must also undergo an aging process of one to two days in the long run.

The aim of the invention is now to develop a method for producing slush from liquefied gases, especially for producing hydrogen slush, by which the application of underpressure can be avoided and by which even larger quantities of slush can be produced. Apart from that it should also be possible to improve the quality of the forming slush so that, for instance, the duration of the aging process of the slush can be reduced and the flowing quality of the forming slush in the lines, valves, etc. can be improved. The aim of the invention is also to develop a device which is appropriate for the application of this method, safe to operate and to produce slush according to the industrial standards, with which the aims indicated can also be achieved with as little mechanical effort as possible.

The invention solves these tasks by solid crystals being formed from liquid particles which are released or admitted under pressure to a gas atmosphere, which has a temperature which is below freezing point of the liquid particles.

The method according to the invention thus ensures freezing or crystalizing of the particles in a relatively short space of time. Therefore, the forming solid particles have more of a round shape and there is a good quality of slush at increasing density. Due to the round shape either no or a slight aging process is necessary in order to ensure a high density of the slush and good flowing. No underpressure is required for producing the slush so that safety risk is reduced extremely in case hydrogen slush is produced.

According to another feature of the invention, the liquid particles are formed in a special and simple way by atomization of the liquefied gas.

For this process only an appropriate atomizing device device is required which can be mounted in a simple manner and consists of at least a nozzle or a centrifugal and mixing chamber or similar.

The atomization process can be effected in a simple manner at least partly by gas being supplied to the atomizing device under pressure which preferably is according to the gaseous phase of the supplied liquefied gas.

Therefore the liquefied gas supplied to the atomizing device can be cooled down before and/or during the atomizing process by means of a gaseous cooling medium. Additional cooling-down shortens the period of crystalization.

The method can be designed in such a way that either additionally or alternatively to atomization and by applying a supplied gas which is pressurized, atomization can be effected at least partly when the liquefied gas discharges into the cold gas atmosphere.

In order to ensure atomization which is as optimum as possible, i.e. bursting of the liquid jet discharging from the atomizing device, the pressure in the cold gas atmosphere is set at a rate which is below the corresponding critical pressure at the discharge aperture of the atomizing device.

In order to minimize the safety risk, the pressure in the cold gas atmosphere where crystalization occurs is set in such a way so that it corresponds at least to the ambient air pressure, it will particularly be at a value that is slightly above the ambient air pressure.

The inventive method has the special advantage that the forming slush can be continuously drained off essentially during the production of new slush. For this process it is favourable if draining-off of the slush is controlled by constant measurement of its density, which ensures the same quality of the drained slush.

The inventive method is especially suitable for producing hydrogen slush which has become more important as cryogenic fuel.

In this case helium gas is suitable as a cooling medium which is to be supplied to the atomizing device.

There is an advantage when a helium gas atmosphere, which can be made available at a corresponding low temperature, is applied as a cold gas atmosphere where the liquid particles freeze or crystalize.

The present invention also relates to a device for producing slush from liquefied gas using a cryostat container, which is partly filled with liquefied gas that mixes with solid crystals to produce slush. The inventive device is characterized by an atomizing device arranged in the cryostat container for forming liquid particles from supplied liquefied gas. This device discharges the liquid particles above the gas in the container into a gas atmosphere, which has a temperature below the freezing point of the liquid particles.

The inventive device thus ensures in a simple manner that crystals can form in a relatively short space of time, which ensures a high quality of slush.

The atomizing device can be mounted simply and consists of at least a nozzle or a centrifugal and mixing chamber or similar.

In order to ensure atomization of the supplied liquefied gas, different possibilities are available. There is one design that is especially simple by which the atomizing device has a supply line for the pressurized gas which thus effects atomization within the atomizing device.

In another design, the discharge aperture of the nozzle of the atomizing device is designed in such a way so that the set pressure there is higher than that in the cold gas atmosphere outside of the pressure of the atomizing device. In this type of design, the jet can burst when discharging out of the atomizing device thus causing an optimum turbulence of the forming liquid particles.

In order to maintain the crystallization period as short as possible, the atomizing device can have another supply line for a gaseous cooling medium. In case of a design with a centrifugal or mixing chamber, the supply of a cooling medium in the atomizing area is especially profitable.

In a preferable design of the atomizing device, the gaseous cooling medium is supplied in a pressurized state by means of gas nozzles and then led into the atomizing device in a gas guide cone which forms a discharge gap in the area of the nozzle. In this design the gas jet is not only a cooling medium, it also contributes to a turbulence of the liquid particles and the forming crystal particles discharging from the nozzle.

In order to ensure as far as possible that there is a constant cold gas atmosphere in the cryostat container, it is of an advantage, if the container has a number of inlets for supplying the gas which forms the cold gas atmosphere. These inlets shall be specially arranged as a sprinkler. This also enables a quick desired change of pressure.

A continuous production of slush is possible with the invention because it can be provided with devices to drain off the forming slush and to supplement the quantity of liquefied gas during the manufacturing process. In order to ensure the good quality of the drained slush, the device is equipped with a system for measuring the density of the slush which controls draining of the slush.

The device can be profitably applied to produce hydrogen slush from hydrogen.

In this case the pressurized gas supplied for atomization within the atomizing device will be hydrogen which will be also an advantage.

Helium gas is especially suitable in this case as cooling medium for the supplied liquid hydrogen.

Helium is also especially suitable for the cold gas atmosphere within the cryostat container because it ensures the required low temperatures.

The invention can be developed into a production plant directly, with which the larger quantity of slush can be produced. It can be equipped, for example, with a number of atomizing devices which can be connected as a ring or similar.

Further features, advantages and particulars of the invention will now be shown and described in detail in the diagram which present examples of the design of the device. FIG. 1 shows an intersection by a simply depicted invention for producing slush from liquefied gas, by which the invention is described on the basis of the production of hydrogen slush, FIG. 2 a possible basic design of the atomizing device shown in FIG. 1, FIG. 3 another somewhat concrete design of an atomizing device in a longitudinal cross-section and FIG. 4 a top view of a possible arrangement of a number of atomizing devices for a medium-sized production plant.

In case of the invention for the production of slush, here especially the production of hydrogen slush, it relates to a special spray method, by which the solid crystalized portion of the slush forms from the atomized particles of liquid hydrogen. A gaseous medium is preferred for the atomization of liquid hydrogen, e.g. gaseous hydrogen, set under a higher pressure, by which the stream of the atomized hydrogen particles enters into a cold (approx. 11 k) helium gas atmosphere and expands. Solid hydrogen crystals form there which settle on the surface of the liquid hydrogen (triple point hydrogen, 13.8 k) in the system and then sinks into it. During this process hydrogen slush forms with an increasing portion of crystalized particles and thus at increasing density and quality.

Figure 2:
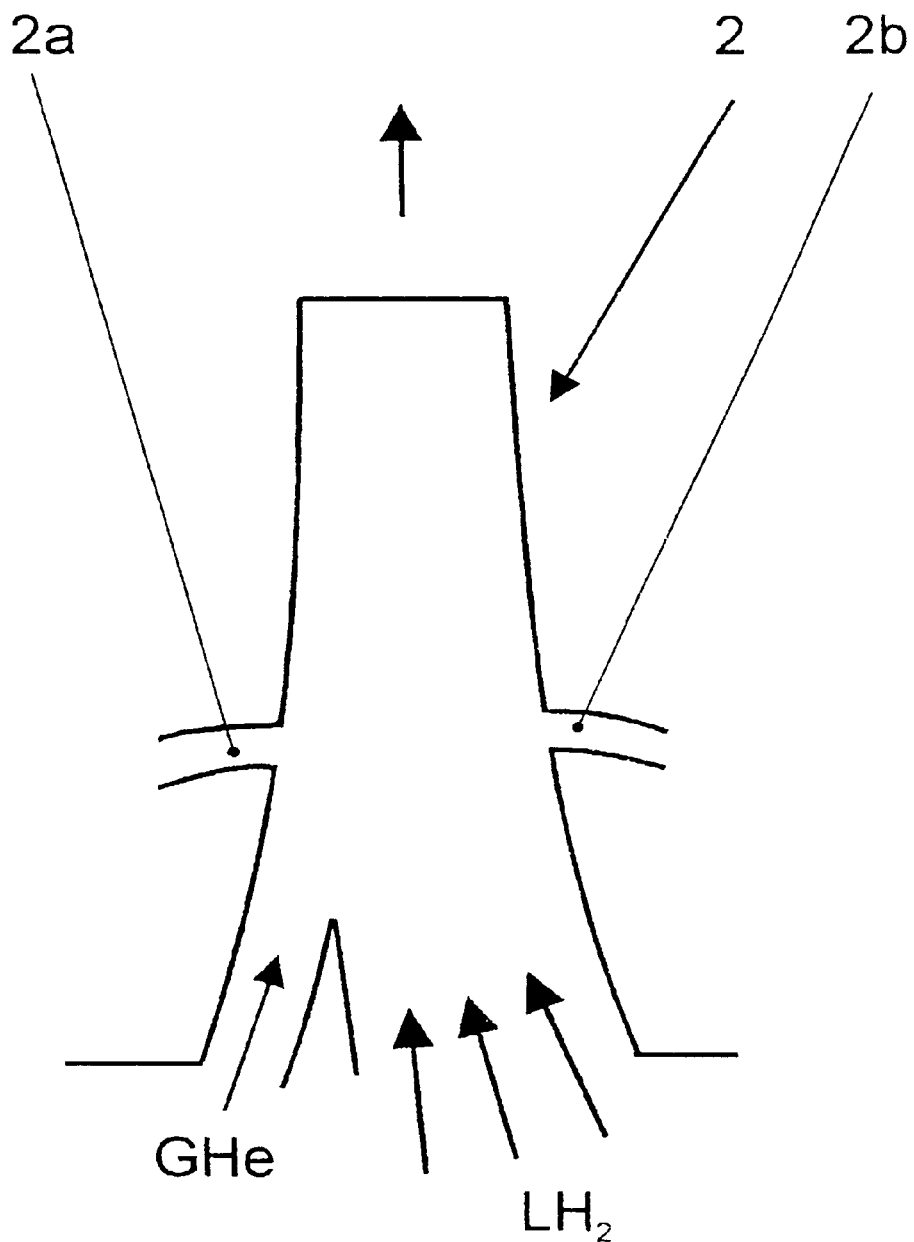

The diagram in FIG. 2 shows various possibilities of the design of atomization, applying the invention, atomizing device 2.

Liquid hydrogen ($LH_2$) is supplied to atomizing device 2 in the convergent trumpet-shaped cross-section and transported to isolated nozzles which are arranged in the area of the orifice and which have not been illustrated here. Gaseous helium (GHe) is supplied in the required quantity as cooling medium. Pressurized gaseous hydrogen ($GH_2$) is supplied by means of supply line 2 a before the area of the orifice of atomizing device 2, by which liquid hydrogen at least partly atomizes. Extensive and complete atomization can be achieved by adequate control of pressure and quantity of the gaseous hydrogen. Instead of gaseous hydrogen or in addition to this, gaseous helium can also be applied for atomization by means of another supply line 2b. At the same time gaseous helium cools down the forming particles. The forming hydrogen particles ($H_2$ particles) expand after discharging from the nozzle into the cold helium gas atmosphere and freezes there so that hydrogen crystals are formed.

Crystallization requires only a short space of time so that the shape of the forming particles are mostly round. This favourably influences the quality of the forming slush, e.g. its flowability, and requires either no or only a short aging process of the forming slush.

The liquid hydrogen ($LH_2$) which is supplied to the nozzle can be supplied in any liquid state which is between its state as $NBPLH_2$ (normal boiling point liquid hydrogen 20 k, 1 bar) and its state as $TPLH_2$ (triple point liquid hydrogen 13.8 K, 0.07 bar).

Atomization of liquid hydrogen ($LH_2$) can be achieved according to the design of atomizing device 2 and when the pressure ratio is set accordingly, at least partly, and during discharging out of the nozzle, by bursting of the hydrogen jet when discharging out of the nozzle. In this way there is an optimum turbulence of the hydrogen particles in the helium gas atmosphere. This "bursting" is achieved by dropping of pressure in the helium gas atmosphere below the corresponding critical pressure of the discharge aperture of the nozzle. During this process atomization can take place entirely during discharging out of the nozzle if the nozzles are appropriately designed, especially the cross-section surface at the discharge, and further parameter, like the pressure ratio.

Figure 3:
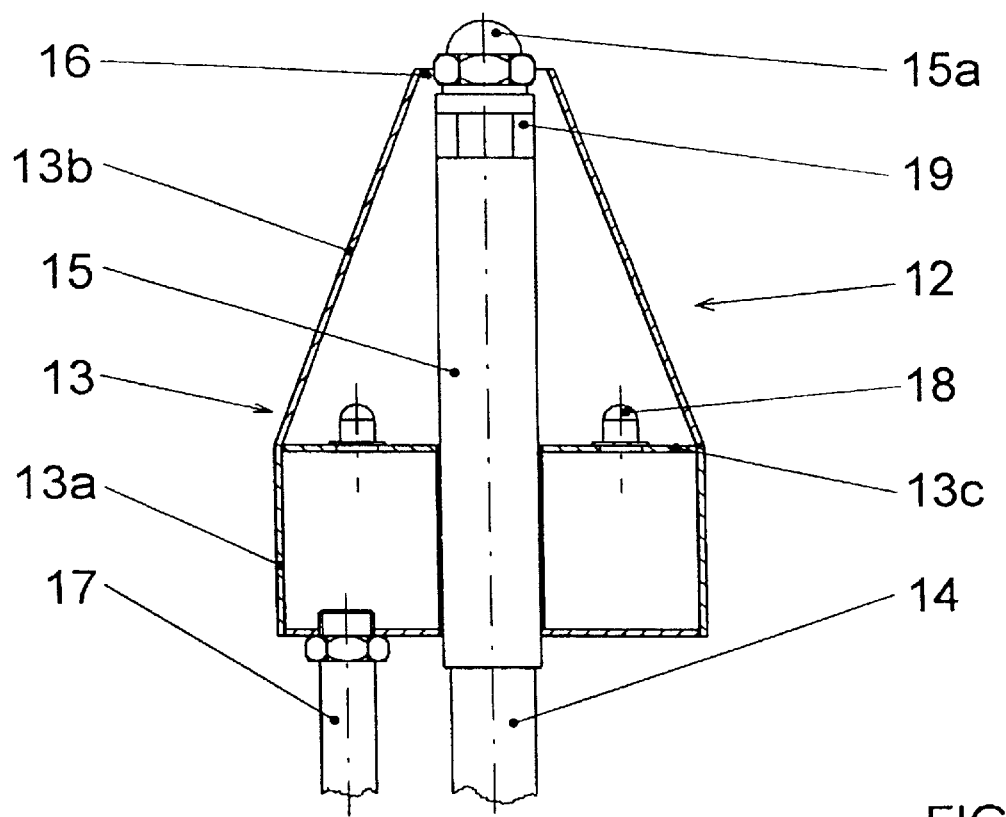

FIG. 3 shows another possible and somewhat concrete example of a design of an invented atomizing device 12. Atomizing device 12 comprises a housing 13, which consists of a special cylindrically designed basic part 13a and a frustum-shaped gas conducting piece 13b, between which there is an intermediate piece 13c, a type of plate. The cryogenic liquid to be atomized, here liquid hydrogen, is supplied via line 14 of atomizing device 12 and directed in the internal part of the housing 13 via a nozzle carrier 15 to nozzle 15a, where bursting of the jet occurs due to the hypercritical discharge.

Nozzle 15a is located in the area of the upper narrow end of the frustum-shaped gas conducting part 13b which is not closed, but forms discharge gap 16 between nozzle 15a or nozzle carrier 15 and the upper housing edge.

Basic part 13a of housing 13 forms a ring channel for cooling gas around line 14 or nozzle carrier 14 which is directed under pressure via another line 17 into the channel. The cooling gas in this case is especially gaseous helium (GHe) which has a temperature lower than that of the cryogenic liquid.

The cooling gas is pressed from the ring channel in basic part 13a via a number of gas nozzles 18 into the internal part of the frustum-shaped gas conducting part 13b and streams there towards discharge gap 16 where it encloses the liquid particle jet flowing out of nozzle 15a like a cooling jacket. The gas jet also contributes to additional turbulence of the liquid particles thereby.

Nozzle 15a can be provided with a twist bore which also contributes to turbulence of the liquid jet. In addition a heating device 19, which can be switched on as desired, can ensure that the cryogenic liquid does not freeze within the area just in front of the discharge aperture of nozzle 15a.

Atomization of hydrogen can also be effected in the centrifugal or mixing chamber where gas for the atomization and also a cooling medium (helium gas) streams in. During this process particles are mixed with the cooling medium and discharge out of the atomizing device at a temperature that is near to the freezing point.

The coldness that effects quick crystalization of the hydrogen particles is now ensured on the one hand by expansion taking place during discharge and on the other hand by the temperature of the helium gas atmosphere in which the atomized hydrogen particles enter.

As mentioned it is favourable in this connection if cold helium gas is directed into the atomizing device or the mixing chamber.

The hydrogen crystals which are formed in the helium gas atmosphere sink on the surface of liquid hydrogen (TPLH2, 13.8 K, approx. 0.07 bar), mixes with the liquid hydrogen and is formed to slush together with it at increasing quality. An occasional mechanical mixing of the slush can contribute to improving its flow quality.

Blending or mixing of the produced slush also prevents unintentional coagulation of same. As an alternative to blending, a helium gas stream which can be directed via gas nozzles into the slush or a heating device can be applied to prevent coagulation.

FIG. 1 shows a diagram of a basic design of a device that operates according to the invention. The device comprises a cryostat container 1, the walls of which are insulated accordingly (vacuum insulation and superinsulation by special $LN_2$ radiation protection). At the upper part of container 1 a supply line for the gaseous helium, which will be supplied at a temperature of approx. 11 K, will be provided through the cover. The supply line discharges preferably in a type of ring channel from where helium gas can stream in via a number of orifices 3, like a sprinkler.

At the bottom part of container 1 there is, as already mentioned, liquid hydrogen 4 through which atomizing device 2 is also directed. This has the advantage of additional cooling of atomizing device 2. The crystalization process can be monitored via window 5.

By means of the supplied gaseous helium, the pressure in container 1 above the liquid hydrogen 4 or the forming slush is maintained slightly above 1 bar. This minimizes the safety risk because air cannot be sucked in through any leakages.

Furthermore a high pressure relief valve 6 can be provided which is activated at a certain inner pressure of, for instance, 1.1 bar.

The length of time during which the hydrogen particles can be spun until crystalization in container 1 can be controlled by setting the pressure of the helium which streams in like a sprinkler. For this purpose an equilibrium can be set between the gaseous helium from the top and the $GH_2/LH_2$ stream which is at the bottom. At the bottom part of the container there is an outlet 7 for the produced hydrogen slush ($SLH_2$), the production of which is constantly being increased. By monitoring and measuring the pressure of the formed slush, the discharged quantity can be regulated. At the same time corresponding supply lines ensure, in a way that has not been described, that liquid hydrogen is supplemented in container 1. According to this, a continuous production of slush is possible. In this way even when handling the slush a simple and quick compensation (replacement) of melted slush is ensured.

The invention also comprises a heat exchanger which is not illustrated. A heat exchanger will be provided to transform the existing medium in the gaseous phase into the cryogenic liquid (e.g. $LH_2$) to be atomized, which is carried out with liquid helium (LHe) in the case of hydrogen. Another heat exchanger cools the warm gaseous medium (e.g. GHe) to cold gaseous medium, especially also by applying liquid helium (LHe). The cold gaseous medium (e.g. GHe cold) is used on the one hand for the above mentioned sprinkler and on the other hand as cooling gas for the atomizing device.

The device described in its basic construction can be developed into a complete production plant for large quantities of hydrogen slush. This is simply possible, for instance, by connecting a number of atomizing devices, e.g. ring-shaped, to one another.

Figure 4:
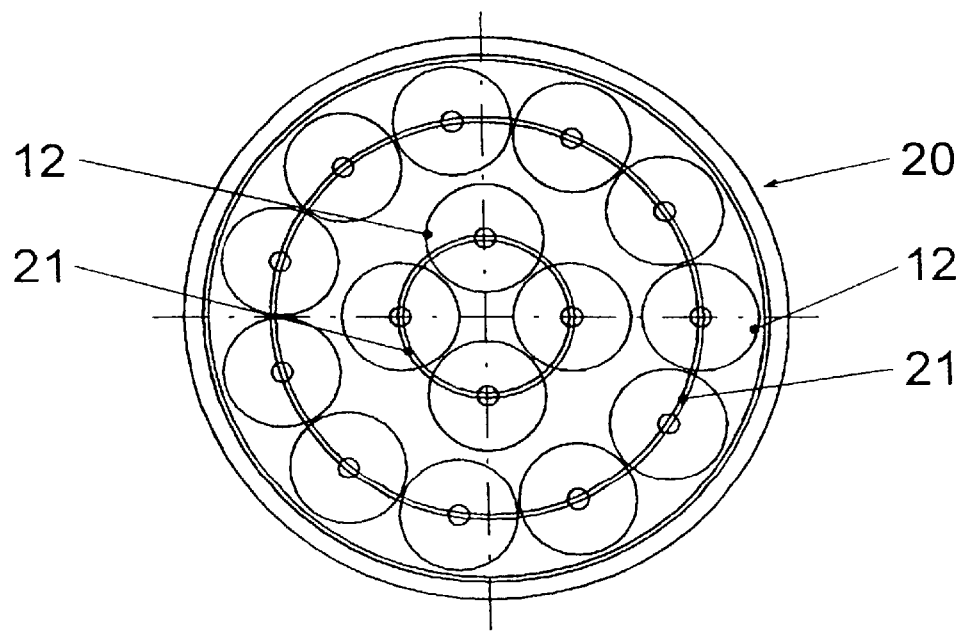

FIG. 4 shows a top view of a very favourable arrangement from a number of atomizing devices 12, in this case fifteen. The slush production plant comprises a cylindrical supporting housing 20 which is especially vacuum-insulated and radiation-protected and in which two rings of the atomizing devices 12 are arranged in a concentric way. There are ring-shaped supply lines 21 for the cryogenic liquid and the cooling gas provided for each of these rings. A slush drainage which is not illustrated here can be provided to collect the produced slush.

Apart from the manufacture of hydrogen slush, the production of other types of slush from other liquefied gases can be achieved according to the method of the invention and with the appropriate adapted devices accordingly, e.g. nitrogen, by which slush is applied as a cryogenic cooling agent during long transport periods, or even oxygen.

What is claimed is:

1. A method for producing slush from liquefied gas by which solid crystals are formed which mix with the liquefied gas to produce slush characterized by the release or admission to a gas atmosphere of pressurized solid crystals formed from liquid particles which has a temperature below the freezing point of the liquid particles and the liquid particles being formed by atomization of the liquified gas.

2. Method according to claim 1 characterized by atomization is effected by means of an atomizing device (2, 12) which comprises a nozzle (15a), a centrifugal and mixing chamber.

3. Method according to claim 2 characterized by atomization is effected at least partly by means of a pressurized gas supplied to the nozzle (2), a centrifugal and mixing chamber.

4. Method according to claim 3 characterized by this gas of the gaseous phase corresponding to the supplied liquefied gas.

5. Method according to claim 4 characterized by the liquefied gas supplied to the atomizing device (2, 12) being cooled down before atomization by means of a gaseous cooling medium.

6. Method according to claim 2 characterized by atomization being effected at least partly at the discharge of liquefied gas into the cold gas atmosphere.

7. Method according to claim 6 characterized by pressure in the cold gas atmosphere being set lower than the corresponding critical pressure in the discharge aperture of the nozzle (15a) of the atomizing device (2, 12).

8. Method according to claim 7 characterized by pressure in the cold gas atmosphere being set to at least the value of the ambient air pressure.

9. Method according to clam 8 characterized by forming slush being drained off at least continuously during the production of new slush.

10. Method according to claim 9 characterized by the slush that is drained being controlled by means of constant measurement of the density.

11. Method according to claim 10 characterized by the liquefied gas being liquid hydrogen.

12. Method according to claim 11 characterized by the liquid hydrogen supplied to the atomizing device is cooled down by supply of helium gas.

13. Method according to claim 12 characterized by a helium gas atmosphere being the cold gas atmosphere.

14. A device for producing slush from liquefied gas is a cryostat container which is partly filled with liquefied gas which is mixed with solid crystals to produce slush characterized by an atomizing device (2, 12) for forming liquid particles from supplied liquefied gas to release the liquid particles above the liquefied gas in the container into the gas atmosphere which has an ambient pressure and a temperature below the freezing point of the liquid particles wherein the liquid particles are formed by atomization of the liquefied gas.

15. Device according to claim 14 characterized by the atomizing device (2, 12) comprising a nozzle (15a), a centrifugal and a mixing chamber.

16. Device according to claim 15 characterized by the atomizing device having a supply line (2a) to supply pressurized gas.

17. Device according to claim 16 characterized by the discharge aperture of the nozzle (2) of the atomizing device being selected in such a way that the set pressure there exceeds the pressure in the cold gas atmosphere outside of the atomizing device.

18. Device according to claim 17 characterized by the atomizing device (2, 12) having at least one supply line (2b, 17) to supply a gaseous cooling medium.

19. Device according to claim 18 characterized by the atomizing device (12) having gas nozzles (18) to supply the gaseous pressurized cooling medium.

20. Device according to claim 19 characterized by the atomizing device (12) having a gas guide cone (13b) for the gaseous cooling medium which forms a discharge gap (16) in the area of the nozzle (15a).

21. Device according to claim 20 characterized by the supply line of the gas forming the cold gas atmosphere having a number of inlets (3) which are especially arranged like a sprinkler.

22. Device according to claim 21 characterized by devices being provided for draining off the formed slush and to supplement the quantity of the liquefied gas during the production process.

23. Device according to claim 22 characterized by having a device for measuring the density of the slush with which the draining off of the slush is controlled.

24. Device according to claim 23 characterized by liquid hydrogen being the liquefied gas.

25. Device according to claim 24 Characterized by hydrogen being the pressurized gas which is supplied to the atomizing device.

26. Device according to claim 18 characterized by helium gas being the cooling medium.

27. Device according to claim 26 characterized by helium gas forming the cold gas temperature.

28. Device according to claim 27 characterized by having a number of atomizing devices (12) which are arranged in a circular shape.

* * * * *